May 29, 1956  A. T. KORNYLAK  2,747,724
GUIDED CARRIER CONVEYOR
Filed Sept. 12, 1952  2 Sheets-Sheet 1
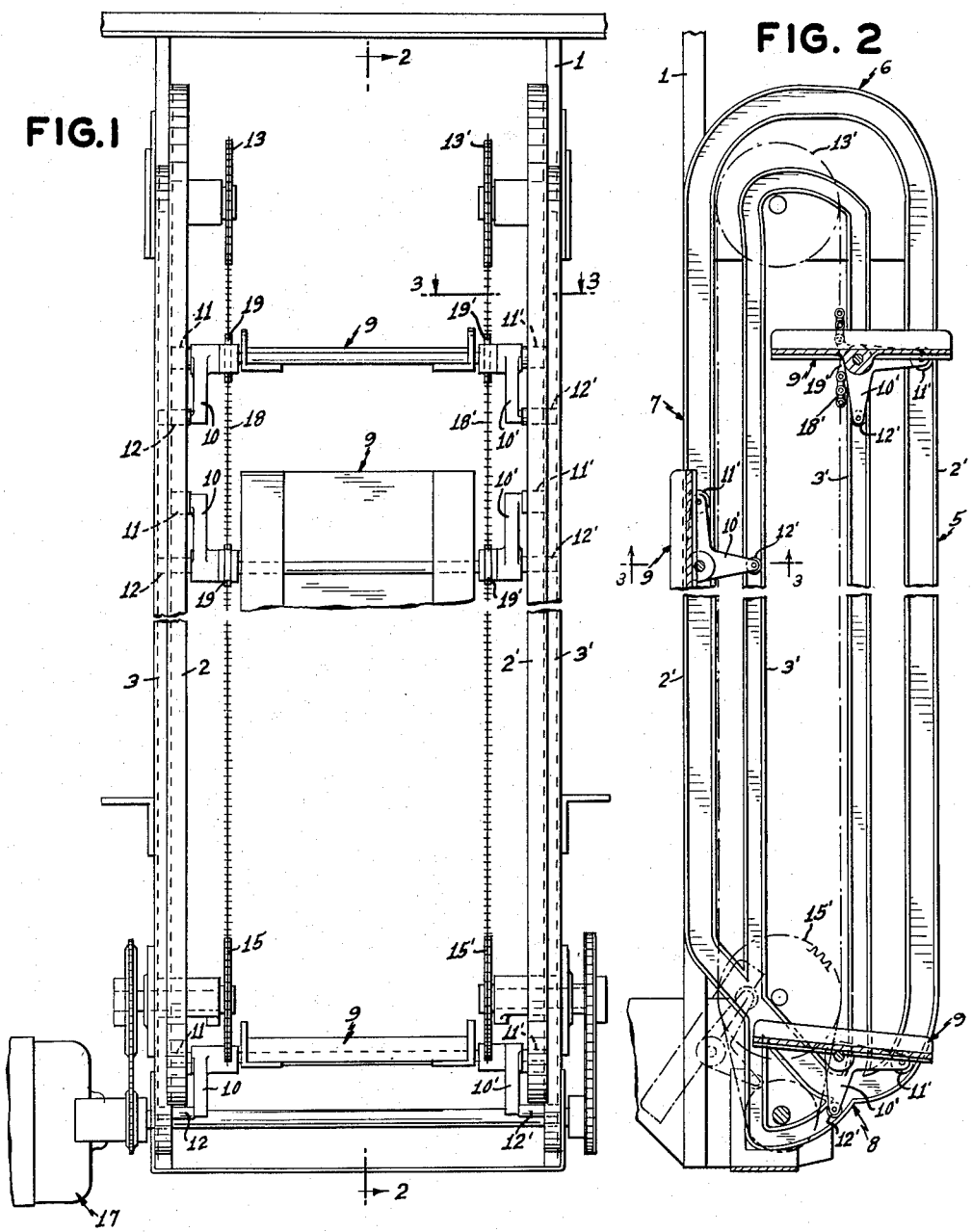
INVENTOR.
Andrew T. Kornylak
BY
Pennie, Edmonds, Morton, Barrows & Taylor
ATTORNEYS May 29, 1956  A. T. KORNYLAK  2,747,724
GUIDED CARRIER CONVEYOR Filed Sept. 12, 1952  2 Sheets-Sheet 2

INVENTOR.
Andrew T. Kornylak
BY
Pennie, Edmonds, Morton, Barrows, & Taylor
ATTORNEYS

United States Patent Office 2,747,724
Patented May 29, 1956

2,747,724

GUIDED CARRIER CONVEYOR

Andrew T. Kornylak, Jersey City, N. J., assignor to Kornylak Engineering Corporation, Jersey City, N. J., a corporation of New Jersey Application September 12, 1952, Serial No. 309,264

5 Claims. (Cl. 198—155)

This invention relates to a novel guided carrier conveyor for packaged goods and the like.

According to my invention, the carriers of a conveyor may be guided along any desired path and the orientation of the carrier at any point along that path may be positively controlled with respect to an arbitrary reference plane, such as a horizontal plane. To achieve this result, I utilized, at each side of a carrier, a pair of track followers fixed to the carrier and a cooperating pair of tracks to guide the carrier over a predetermined path. Endless chains attached to opposite sides of the carrier supply the driving force and, by reason of their fixed paths, cooperate with the tracks and track followers to orient the carrier.

The two tracks of each pair lie substantially in a single plane and has disproportionate cross sections, that is, one track is wide and shallow whereas the other is narrow and deep. The track followers engaging these tracks have correspondingly disproportionate dimensions such that a given follower will fit into or cooperate with its particular track and no other. Therefore, even though at points of intersection of these tracks a part of one lies within the other as will be more apparent from my later description of a preferred embodiment, the two tracks of a pair may be made to intersect while providing a defined course through the intersection for each follower.

This feature is realized because the long, narrow follower is made too long to enter the wide, shallow track and the wide, short follower is made too wide to enter the narrow, deep track.

By combining this provision for intersection of the tracks with differing paths for the tracks of a pair, the relative positions of the followers, which are fixed to the carrier at locations spaced from each other and are constrained to follow their respective tracks, may be made such as to impose any desired orientation upon the carrier. Thus, the carrier may be maintained in a horizontal position to carry an article even though the path of the carrier is horizontal or vertical or is at some incline to the horizontal. Furthermore, the carrier may be made to fold into a vertical position or completely invert itself within a short span of track.

Important advantages of my improvement are realized in vertical conveyors. For example, the conveyor art prior to my invention shows many proposals for reducing the spatial requirements of vertical conveyors by causing the carriers of the conveyor to fold into a vertical position during their traversal of the inoperative reach, whether it be upward or downward. This is conventionally accomplished by hinging each carrier about a horizontal edge so that it will fold flat against its driving belt or chains under the action of gravity. And in the same manner the carriers are moved into the horizontal position by gravitational forces at the beginning of the conveyors' operative reach. Conveyors of this type necessarily require sufficient clearance at top and bottom to permit the carriers to swing out of or into operative position, and frequently require a pit beneath the conveyor for such clearance if the carriers are to be in loading position at a point reasonably near floor level.

A conveyor dependent on gravitational forces to fold its carriers is uncertain in its operation since slight binding forces may impede folding or unfolding partially or entirely; and frequently catches of some sort are required to hold the carriers in operative position. Should a carrier fail to unfold fully so that its catch may function, the carrier must make a full circuit of the conveyor before it can be useful again.

My invention eliminates the conveyor's dependence on gravitational forces to fold the carriers and with the positive control afforded I may pivot the carriers about any convenient axes such as horizontal axes through their respective centers of gravity. This permits construction of conveyors, the carriers of which travel between the tracks or driving chains, rather than outside them. This feature substantially diminishes the spatial requirements of the conveyor. Furthermore, the operative and inoperative reaches of the conveyor may be more closely spaced because of the rapid and complete folding of the carriers within very short spans of the tracks; and the carriers may be made to traverse the inoperative reach of the conveyor in a completely folded position.

For purposes of comparison spatial efficiency may be defined as $$e = \frac{a}{A} \times 100$$

where $a$ is the horizontal sectional area of the largest package the conveyor can accommodate and $A$ is the area delineated by orthogonal projection of the lateral extremities of the conveyor installation on a horizontal plane such as the floor. Accordingly, a conventional rigid carrier conveyor has an efficiency of the order of 33%; a gravity folded conveyor shows an efficiency of 40%; and a pivoted, suspended carrier conveyor has an efficiency of 36%. My guided carrier conveyor has an efficiency of 65%.

A full understanding of my invention may be had from the following description and the accompanying drawings of a preferred embodiment.

In these drawings:

Fig. 1 is a front view of a vertical conveyor.

Fig. 2 is a side view in section of the conveyor of Fig. 1.

In the drawings similar parts are indicated by similar reference characters.

Figure 3:
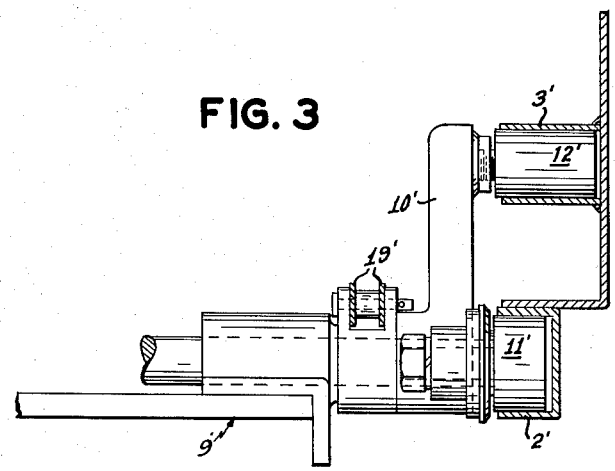
Fig. 3 is a partial edge view in section of the conveyor tracks.

In Figs. 1 and 2 an upright frame 1 supports parallel pairs of substantially coplanar channeled tracks 2 and 3, and 2' and 3'. These pairs of tracks or channels form similar closed circuits. Tracks 2 and 2' have relatively wide, shallow cross-sections as shown in Fig. 3. Cooperating with tracks 2 and 2' are tracks 3 and 3', respectively, which have relatively narrow, deep cross-sections. These pairs of tracks delineate the path of the conveyor, which path comprises an upward reach 5, a folding span 6 at the top of the conveyor, a downward reach 7, and an unfolding span 8 at the bottom. Disposed between the sets of tracks are one or more carriers 9. Lying substantially parallel to the planes of the pairs of tracks and rigidly attached to opposite ends of these carriers are angular control arms 10 and 10' having substantially perpendicular branches. A track follower which may be a sliding shoe or, as I prefer, a roller, is rotatably mounted on each branch of each control arm. Rollers 11 and 11' have relatively short lengths and large diameters and are proportioned to engage tracks 2 and 2' respectively while rollers 12 and 12' have relatively long lengths and small diameters and are proportioned to engage tracks 3 and 3' respectively. A necessary condition which the disproportionate tracks and track followers must meet is that the diameters of the track followers having the larger diameters must be greater than the widths of the narrow, deep tracks, and the lengths of the track followers having the smaller diameters must be greater than the depths of the wide, shallow tracks.

Fig. 3 illustrates the provision of a defined path for each roller through the intersection of the disproportionate tracks of a pair. Roller 11' must remain in track 2', since its diameter is too great to permit its entry into track 3'; and roller 12' must remain in track 3' since its length is too great to permit its entry into track 2'. The same situation obtains at an intersection of tracks 2 and 3.

Endless driving chains 18 and 18' passing over sprockets 13 and 15 and 13' and 15' serve to drive the carriers. At spaced locations along each chain, depending on the number of platforms to be employed, there are provided links 19 and 19' which are rotatably attached to a carrier at the same points as are attached the control arms 10 and 10'.

In operation the driving chains, powered by any suitable source of power 17, pull the carriers along the tracks. As shown in Fig. 2, the tracks in the upward operative reach 5 of each pair are parallel and set apart by the lengths of the branches of the control arms parallel to the platforms of the carriers. The rollers on each control arm are separated by an invariant distance which is greater than the perpendicular distance between the tracks in this reach. There are, therefore, only two positions rollers 12 and 12' may assume with respect to rollers 11 and 11' while the rollers engage their respective tracks, i. e. rollers 12 and 12' may lead rollers 11 and 11' as the carrier progresses along the tracks or rollers 12 and 12' may trail rollers 11 and 11'. Since, in this preferred embodiment, the branches of the control arms carrying rollers 11 and 11' are parallel to the carriers and have lengths equal to the spacing of the tracks in this reach, and the branches of the control arms carrying rollers 12 and 12' are perpendicular to the carriers, a carrier traversing this reach is constrained to the horizontal position if rollers 12 and 12' are made to trail rollers 11 and 11'.

In order to fold the carriers for their traversal of the downward inoperative reach 7, the tracks and chains of the folding span 6 cooperate to lead the carriers from horizontal to a vertical position. To accomplish this, the tracks of each pair in the folding span describe curvilinear paths having a spacing which varies from that of the tracks in the upward reach, namely the length of the branches of the control arms parallel to the carrier platform, to the spacing of the tracks in the downward reach which is equal to the lengths of the branches of control arms perpendicular to the carrier.

In the downward inoperative reach the tracks of each pair are again parallel and the carriers traverse this reach in the vertical or folded position.

The unfolding span 8 returns the carriers to the horizontal position. This is accomplished by continuing the tracks 3 and 3' of the downward reach downward vertically while tracks 2 and 2' change from the downward vertical direction to a path which inclines downwardly to the right to cross over tracks 3 and 3'. At the location where the carrier has been rotated into the horizontal position both tracks of each pair begin an upward inclination to the right which leads the carrier to the beginning of the upward reach. It is seen that this motion of the carrier moves it counter to the gravitational forces conventionally relied on for this unfolding operation, and that the motion takes place between the sets of tracks and above, rather than below, their lowest point. Thus, the need for a pit is obviated while maintaining the loading level of the conveyor reasonably near floor level.

Figure 4:
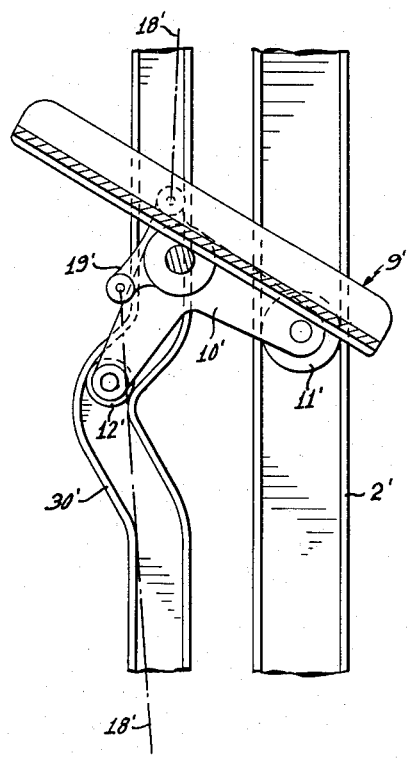
Fig. 4 is a partial view of the conveyor of Fig. 2 showing a carrier discharge section incorporated in the upward reach.
Figure 5:
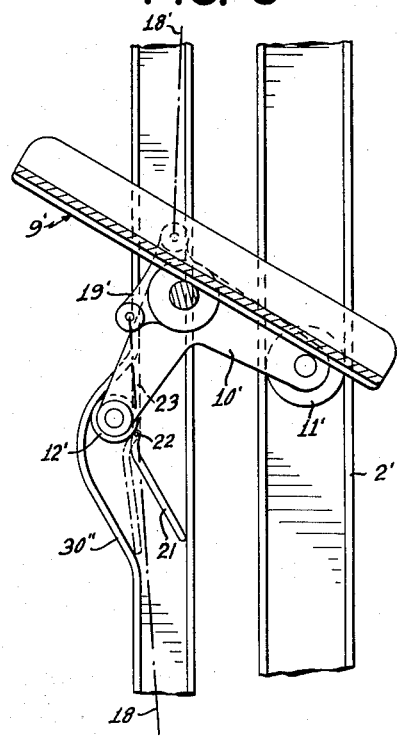
Fig. 5 is a partial view of the conveyor of Fig. 2 showing a selective carrier discharge section incorporated in the upward reach.

According to my invention which provides continuous positive control of the orientation of the carriers, the carriers may be made to unload at any predetermined point along the upward reach of the conveyor by incorporating in the narrow, deep track of each pair a diverging-converging section of track. Figs. 4 and 5 illustrate two modes of this modification.

In Fig. 4 switch track 30' diverges from and then converges toward track 2' while the latter continues in a vertical path. Since the control arm must rotate to accommodate the fixed distance between the rollers to the spacing of the tracks, a carrier passing the discharge section will be rotated into an inclined position and the article being conveyed will slide off.

The modification of the upward reach of the conveyor shown in Fig. 5 provides a selective discharge of the carriers. Here the right wall of the switch track 30" does not depart from the vertical; however, the left wall of track 30" is made to diverge from and then converge toward the right wall. A track switch 21 is pivoted on a rotatable shaft 22 located between the walls of the switch track 30". The track switch is provided with any suitable means such as a handle for rotating it about the shaft 22.

A track gate 23, also pivoted about shaft 22 but held in the closed position by a suitable spring is made so as to open into the channel of track 30" in response to pressure exerted by roller 12' on its left surface. After the roller has passed, the gate closes under the action of the spring.

Thus, this selective discharge section provides collateral linear and curvilinear paths for the roller 12'. When set in the open position shown in solid outline, switch 21 directs roller 12' into the diverging path which causes the carrier to incline downwardly to the right and discharge its contents as in the discharge section of Fig. 4. As the carrier continues to move upwardly after discharge, roller 12' follows the converging path of switch track 30' through track gate 23 and into the vertical path of the track.

If the track switch is set in the closed position shown in broken outline, the roller continues along the linear path of the switch track and no discharge of the contents of the carrier occurs.

It is clear that both sets of tracks of the conveyor must be similarly modified to provide this selective discharge, and that any number of discharge points may be provided. For example, a discharge point could be located at the floor level of each of several floors of a building in which the conveyor is installed.

Although the layout and operation of the conveyor shown in Fig. 2 is relatively simple, it is illustrative of the wide scope of carrier orientations attainable with my invention. It will be apparent to one skilled in the art that any of the separate orientations assumed by a carrier in Fig. 2 could be continued merely by prolonging the track members and driving chains at the same inclination and spacing they possess at the point where the carrier attains the desired orientation.

I claim:

1. An endless guided carrier conveyor comprising intersected first and second endless track channels having their open sides in a substantially common plane, which channels define for said conveyor an operative reach, an inoperative reach, a folding span interconnecting said operative and inoperative reaches at the terminal extreme of said operative reach, an unfolding span interconnecting said inoperative and operative reaches at the initial extreme of said operative reach, the width and depth of said first channel being respectively greater and less than the corresponding dimensions of said second channel; a carrier; a control member rigidly fixed to the end of said carrier; first and second track followers rotatably mounted on said control member and slidably engaged in said first and second channels respectively, the diameter and length of each of said track followers being similar respectively to the width and depth of the channel engaging that track follower; and means for maintaining said track followers in engagement with their respective channels, whereby each track follower is confined to defined courses through the intersections of said channels.

2. An endless guided carrier conveyor comprising first and second sets of endless tracks lying respectively in substantially parallel planes, each of said sets of tracks including first and second channeled tracks, the width of the cross-section of said first track being greater than the width of the cross-section of said second track, and the depth of the cross-section of said first track being less than the depth of the cross-section of said second track, said tracks defining for the conveyor an operative reach wherein the first and second tracks of each set are parallel, an inoperative reach wherein the first and second tracks of each set are parallel, a folding span interconnecting the operative and inoperative reaches at the terminal extreme of said operative reach, and an unfolding span interconnecting the inoperative and operative reaches at the initial extreme of the operative reach; a pair of coaxial idler sprockets rotatably mounted between the sets of tracks at the folding span; a pair of coaxial driving sprockets rotatably mounted between the sets of tracks at the unfolding span; a pair of endless driving chains, each of which operatively engages a driving sprocket and an idler sprocket; a plurality of carriers rotatably mounted between said chains at spaced locations along them; a control member provided for each end of each carrier and rigidly fixed thereto; pairs of track followers rotatably mounted on each control member, the first track follower of each pair being dimensionally similar to the cross-section of said first track and slidably engaged therein, and the second track follower of each pair being dimensionally similar to the cross-section of said second track and slidably engaged therein; said tracks of each set being cooperatively spaced, directed, and intersected so as to positively control the orientation of said carriers at every location along the reaches and spans of the conveyor.

3. An endless guided carrier conveyor comprising substantially coplanar first and second endless channeled tracks which define for said conveyor an operative reach wherein said first and second tracks are parallel, an inoperative reach, a folding span interconnecting said operative and inoperative reaches at the terminal extreme of the operative reach, and an unfolding span interconnecting said inoperative and operative reaches at initial extreme of the operative reach; a carrier; a control member rigidly attached to said carrier; first and second track followers rotatably mounted on said control member and slidably engaged in said first and second tracks respectively; a discharge section in the operative reach wherein one of said tracks diverges from and then converges on the other of said tracks; and means for maintaining said track followers in engagement with their respective tracks; said tracks being variably spaced and differently directed at selected locations along them whereby the constraints imposed on the track followers by their respective tracks provide positive control of the orientation of the carrier at every location along said tracks.

4. An endless vertical guided carrier conveyor comprising substantially coplanar first and second endless channeled tracks which define for said conveyor an operative reach wherein said first and second tracks are parallel, an inoperative reach, a folding span interconnecting said operative and inoperative reaches at their uppermost extremes; an unfolding span interconnecting said inoperative and operative reaches at their lowermost extremes, the width and depth of said first channeled track being respectively greater and less than the width and depth of said second channeled track; a carrier; a control member rigidly attached to said carrier; first and second track followers rotatably mounted on said control member and slidably engaged in said first and second tracks respectively, the diameter and length of each follower being similar respectively to the width and depth of the channeled track engaged thereby; a carrier discharge section interposed in said upward reach including a track continuous of said first track and collinear therewith, and a curvilinear track continues of said second track which causes said second track follower to deviate from and return to a path collinear with said second track; and means for maintaining said track followers in engagement with their respective tracks; said tracks being variably spaced and differently directed at selected locations along them whereby the constraints imposed on the track followers by their respective tracks provide positive control of the orientation of the carrier at every location along said tracks.

5. An endless vertical conveyor comprising substantially coplanar first and second endless channeled tracks which define for said conveyor an upward operative reach wherein said first and second tracks are parallel, a downward inoperative reach, a folding span interconnecting said upward and downward reaches at their uppermost extremes, and an unfolding span interconnecting said downward and upward reaches at their lowermost extremes, the width and depth of said first channeled track being respectively greater and less than the width and depth of said second channeled track; a carrier; a control member rigidly attached to said carrier; first and second track followers rotatably mounted on said control member and slidably engaged in said first and second tracks respectively, the diameter and length of each follower being similar respectively to the width and depth of the channeled track engaged thereby; a selective carrier discharge section interposed in said upward reach including a track continuous of said first track and collinear therewith, a switch track having collateral linear and curvilinear paths continuous of said second track, and a track switch rotatably mounted in said switch track to selectively open the linear or curvilinear paths of said switch track to said second track; and means for maintaining said track followers in engagement with their respective tracks; said tracks being variably spaced and differently directed at selected locations along them whereby the constraints imposed on the track followers by their respectively tracks provide positive control of the orientation of the carrier at every location along said tracks.

References Cited in the file of this patent

UNITED STATES PATENTS

| | | |
|---|---|---|
| 1,643,224 | Shelton | Sept. 20, 1927 |
| 1,765,118 | Abriani | June 17, 1930 |
| 1,903,835 | Olson | Apr. 18, 1933 |
| 2,703,643 | Parsons | Mar. 8, 1955 |

FOREIGN PATENTS

| | | |
|---|---|---|
| 470,084 | Germany | Jan. 5, 1929 |
| 572,008 | Germany | Feb. 16, 1933 |
| 415,567 | Great Britain | Aug. 30, 1934 |